March 26, 1946.                A. R. WHEAT                2,397,305
                              AUGER CONVEYER
                           Filed Sept. 16, 1944

Inventor
A. R. Wheat
By Webster & Webster
Attorneys

Patented Mar. 26, 1946

2,397,305

UNITED STATES PATENT OFFICE 2,397,305

AUGER CONVEYER

Alexander R. Wheat, Stockton, Calif.

Application September 16, 1944, Serial No. 554,354

3 Claims. (Cl. 198—213)

This invention relates in general to an improved auger or screw conveyer, and in particular the invention is directed to, and it is one of my objects to provide, an auger conveyer of novel construction especially designed for use in grain harvesters.

In conventional grain harvesters the auger conveyers run in a conveyer box or trough having a metallic lining which follows the periphery of the helical blade of the conveyer in adjacent but clearance relation thereto for the purpose of preventing undue wear, which would otherwise occur between the helical blade and said lining. This clearance between the helical blade and lining is disadvantageous as grain or the like tends, when being harvested, to engage between the periphery of the helical blade and said lining, which results in undesirable cracking of the grain. Additionally the conveyer does not run clean, which is objectionable for several reasons, as for example a certain quantity of grain is permitted to remain in the conveyer box when the harvester is not in use, which draws moisture and results in rusting of the lining of said conveyer box.

It is therefore an additional object of this invention to provide, in a grain harvester auger conveyer as above, a relatively tough but resilient wiping strip or shoe secured on the peripheral portion of the helical conveyer blade and running in wiping relation to the lining of the conveyer box.

An important advantage of this arrangement is that whereas in the conventional auger a certain amount of grain inevitably remains in the conveyer box, with my structure the box will be positively swept clean upon rotation of the auger after the feed thereto has ceased.

When shifting the harvester from a barley field to an oat field for instance, no grain from the one field will thus be mixed with the grain being sacked from the other field, as is now the case. Also, when moving from a weedy field to a clean field, no weed seed will remain in the auger box to mix with the clean grain. These are important considerations when the grain is to be used for seeding purposes, as will be evident.

A further object of the invention is to produce a simple and inexpensive device, and yet one which will be exceedingly effective for the purpose for which it is designed.

In the drawing similar characters of reference indicate corresponding parts in the several views.

Figure 1:
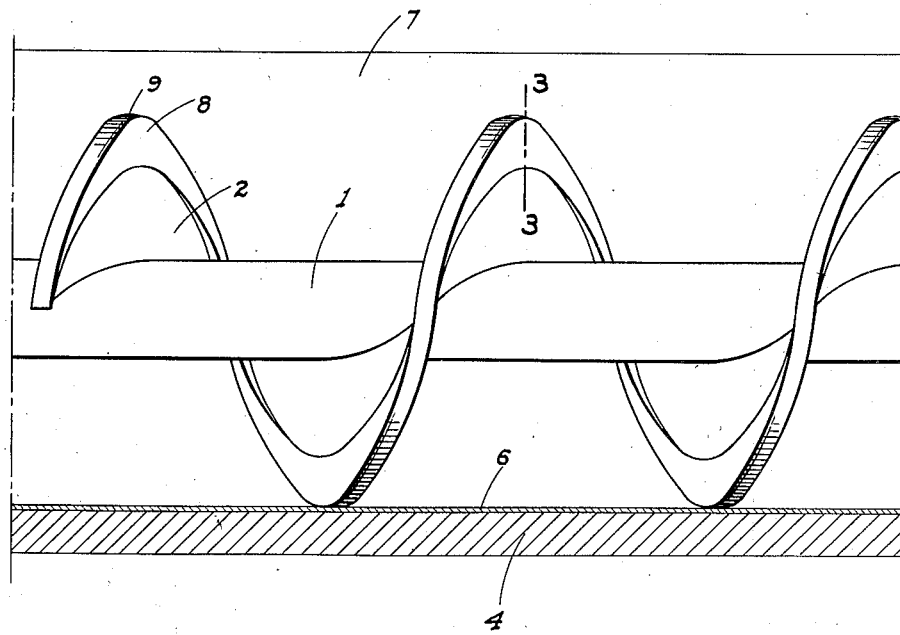
Figure 1 is a fragmentary side elevation of an auger conveyer embodying the present invention; the conveyer box being shown in section.
Figure 2:
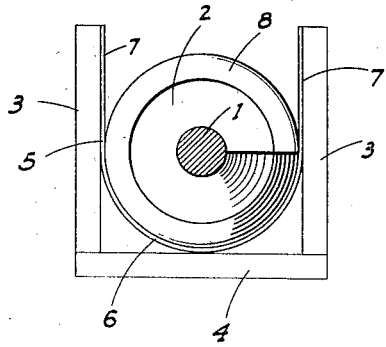
Figure 2 is an end view of an auger conveyer assembly embodying the present invention.

Referring now more particularly to the characters of reference on the drawing, the auger conveyer comprises a driven center shaft 1 to which is secured in conventional manner a metallic helical conveyer blade 2.

The above described auger or screw runs in an open-topped conveyer box or trough which includes upstanding parallel sides 3 and a bottom 4. This box includes a metallic lining 5 which, for substantially the lower half of the screw or auger, is disposed in adjacent but spaced symmetrical relation to the periphery of the metallic helical conveyer blade 2, as at 6. Above said lower one-half of the auger the lining extends upward in parallel relation, as at 7.

A radially outwardly projecting wiping strip or shoe 8 is fixed to the peripheral portion of the helical conveyer blade 2 and extends unbroken for substantially the full length of the latter; such wiping strip or shoe being of heavy-duty, relatively stiff but flexible and resilient material, such as rubber similar to that used for tire treads. This wiping strip or shoe 8 is rounded at its outer end, as at 9, and said end rides in wiping relation on the part 6 of the lining 5 throughout the extent of the lower half of the auger.

By reason of the employing of the wiping strip or shoe 8 the conveyer runs clean and all grain, etc., is advanced through the conveyer without possibility of any grain or cracked portions thereof remaining in the conveyer box.

It is important to note that the wiping strip or shoe 8, with each full revolution thereof, runs against the metallic lining 5 only for approximately 180°, which assures that said strip or shoe will not become overheated due to the frictional contact with the lining, and for the reason that cooling occurs when the wiping strip or shoe is free of the lining.

Figure 3:
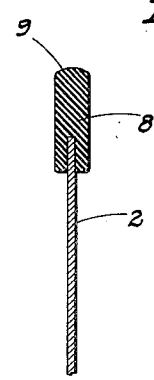
Figure 3 is a cross section on line 3—3 of Fig. 1.
Figure 4:
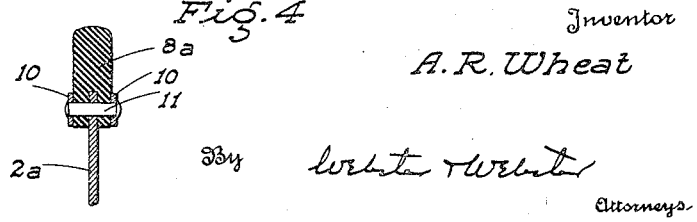
Figure 4 is a similar section showing the rubber strip as positively clamped to the conveyer blade.

The strip or shoe 8 may be molded onto the blade 2 so as to be self-securing, as indicated in Fig. 3, or it may be mechanically secured to said blade as shown in Fig. 4. In this case, thin metal strips 10 are disposed against the opposite sides of the shoe 8a along the base thereof; clamping bolts or rivets 11 projecting at intervals through the shoe, strips and blade 2a.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In an auger conveyer which includes an auger having a helical blade running in an open topped conveyer box, a metallic lining in said box, the lower portion of said lining being in symmetrical, adjacent but spaced relation to the lower portion of the auger, and the upper side portions of the lining being clear of said auger, and a resilient wiping strip secured to the peripheral part of said auger blade and projecting radially outward therefrom, said strip running in wiping contact only with said lower portion of the lining whereby with each full revolution of the auger the strip is free of the lining for a part of said revolution.

2. An auger conveyer for grain harvesters comprising an open top trough, a metallic lining having a semi-circular bottom and substantially parallel sides extending upwardly from the top edges of said semi-circular bottom, a driven shaft extending substantially centrally of the trough, a metallic continuous helical conveyer blade fixed on the shaft, the edge of such blade being disposed in symmetrical relation to but spaced from the semi-circular bottom of the trough, a radially outwardly projecting wiping strip fixed to the peripheral edge of the blade and extending unbroken for substantially the full length of the blade, such wiping strip being of heavy duty rubber, such strip during its travel through the semi-circular bottom of the trough being under compression whereby to hold it in continuous frictional wiping contact with said bottom of the trough to thereby carry all material in the trough to the discharge end of the conveyer.

3. A device as in claim 2 in which the outer edge of the wiping strip is semi-circular in cross section whereby to minimize the wear on the strip while allowing its continuous close frictional wiping contact with the bottom of the trough.

ALEXANDER R. WHEAT.